US005469405A

United States Patent [19]

Tannenbaum

[11] Patent Number: 5,469,405

[45] Date of Patent: Nov. 21, 1995

[54] DETECTION METHOD AND APPARATUS

[76] Inventor: Wesley Tannenbaum, P.O. Box 959, Manomet, Mass. 02345

[21] Appl. No.: 118,774

[22] Filed: Oct. 28, 1987

[51] Int. Cl.[6] ..................... H04B 1/06

[52] U.S. Cl. ..................... 367/135; 367/118

[58] Field of Search ..................... 367/118–120, 135, 367/99, 101

[56] References Cited

U.S. PATENT DOCUMENTS 3,705,381 12/1972 Pipkin ..................... 367/101

4,264,978 4/1981 Whidden ..................... 367/128

4,399,556 8/1983 Whidden ..................... 367/128

*Primary Examiner*—Daniel T. Pihulic

[57] ABSTRACT

The detection of a microphone within a selected site includes broadcasting an acoustic signal having two components with different frequencies selected to produce the re-broadcast, by a microphone in the broadcast field, of a selected resonant responsive signal, and sensing the re-broadcast of such a responsive signal. Determining the direction in which such a responsive signal is sensed determines the location of a microphone detected to be present within the selected site.

16 Claims, 2 Drawing Sheets

DETECTION METHOD AND APPARATUS

This invention was made in part with Government support under Contract Number F30602-84-C-0412 awarded by Rome Air Development Center, Department of the Air Force. The Government claims certain rights in this invention.

This invention relates to a method and apparatus for detecting the presence of certain electro acoustic transducing devices and, further, for determining the relative location of such a detected device. The detection and location of a transducing device according to the invention is surprisingly accurate, and can be done rather quickly and easily, and with relatively compact, low cost and available equipment.

The invention is useful, for example, in determining the presence, and further the location, of a microphone that is hidden from view. The detection and location of a microphone in accordance with the invention can be practiced without regard to whether the microphone is in use, and without contact with, or other intrusion on, the microphone.

The invention is deemed to be applicable to the detection and location of certain electroacoustic transducing devices in general. More particularly, it is understood to be operative with such devices that have a mechanical resonance at an acoustic frequency, and which are non-linear. A further characterization is that the device resonance have a sufficient quality factor (Q) to produce acoustic signal interactions as discussed below. The invention is described below with particular reference to one such device, namely a microphone, The invention is understood to be operative with microphones of different types, including carbon, magnetic, and capacitive or electret.

Further, the invention is deemed applicable for detecting and locating such devices both in air and in other media, including underwater. The practice of the invention in air can, as a specific instance, detect the presence of a hidden listening device. The practice of the invention in water can detect the presence of submerged vessels and other craft, e.g. a submarine, by detecting the presence of hydrophones typically present on the vessel or craft.

The detection and location of a microphone, whether in a room or on a person or otherwise, is often desirable. Prior techniques and equipment for microphone detection can., in some instances, be thwarted by turning off transmission from the microphone. Prior microphone detection techniques also suffer from erroneous responses due to the presence of electrical conductors, such as nails, wires, pipes and the like, present at the site being examined.

It accordingly is an object of this invention to provide a method and apparatus for the detection of a microphone independently of the operative condition of transmission from the microphone and, further, with a minimum of erroneous responses.

Other objects of the invention include the provision of a microphone detecting method and apparatus that provide a relative indication of the location of a detected microphone, that operate with relative simplicity and speed, that are non-instrusive in nature, and that can be practiced with relatively low cost and readily available equipment.

A general object of the invention is to provide a method and apparatus for the improved detection of an electroacoustic transducing device having an acoustic resonance.

It is also an object of the invention to provide such detection not only in air but also underwater.

A further specific object of the invention is to provide a method and apparatus for detecting the presence and location of a submerged hydrophone, and correspondingly of a vessel having a submerged hydrophone.

Other objects of the invention will in part be obvious and will in part appear hereinafter.

SUMMARY OF THE INVENTION

The method and apparatus of the invention apply the finding that a microphone responds to exposure to a selected acoustic signal by re-broadcasting a specific resonant response signal. The selected incident signal can be viewed as a composite of two components with different frequencies. One component includes the acoustic resonant frequency of the microphone being investigated, or at least a multiple of that resonant frequency. A second component of the incident signal includes a frequency different from and less than the first frequency. Further, the second frequency is selected to combine arithmetically with the first frequency so that signal frequencies equal to the sum and to the difference thereof can readily be instrumented, e.g. are suitable for acoustic propagation and for transduction. A specific illustrative example is an incident signal having a 21.5 kilohertz sinusoid gated, at a selected repetition rate, by a second component having a two kilohertz waveform.

In response to the incident acoustic signal, a microphone radiates and hence re-broadcasts an acoustic signal having a component with a frequency at the sum of the two incident frequencies, e.g. at 23.5 kilohertz and a further component with a difference frequency, e.g. with a frequency of 19.5 kilohertz. The response signal set in this instance thus has, in effect, upper and lower side bands of the incident first frequency signal signal component.

The general method of the invention accordingly detects a microphone device, within a given site or locale, with the step of broadcasting, at the site, an acoustic signal having two frequency components selected to excite the microphone device to re-broadcast a selected resonant response signal set. A further step of the method is to sense the response signal set.

The practice of the invention can further include the step of determining the direction from which the re-broadcast signal set is received, to determine the relative location of the detected microphone device.

Apparatus according to the invention correspondingly includes an element for broadcasting an acoustic signal with two components selected to produce the re-broadcast, by a microphone device in the broadcast field, of a selected responsive signal set. The apparatus further has an element for sensing the selected re-broadcast signal set, The broadcast signal includes two frequency components, one at the resonant frequency of the microphone device being investigated, or at a multiple thereof, and the other at a different, lower frequency. In one preferred illustrative practice, the two components of the broadcast signal differ in frequency by approximately one order of magnitude.

In the illustrated practice of the invention set forth herein, the selected responsive signal set includes signal components with frequencies at the sum, and at the difference, between the two component frequencies of the broadcast signal. That is, the responsive signal set which a microphone device being investigate re-broadcasts has one component with a frequency determined by the sum of frequencies of the two broadcast signal components and a second frequency determined by the difference between these two broadcast frequencies.

The apparatus typically further includes an element for determining the direction from which the re-broadcast signal set originates, and thereby for determining the direction relative to the broadcast location, of a microphone device which produces the selected re-broadcast signal set.

In a typical practical embodiment, the broadcast element has a control signal source which gates an oscilator, at a selected rate, that in turn drives a transducer, typically in the form of a loudspeaker, for producing the acoustic broadcast signal. The broadcast signal hence is the oscillator output signal as gated by the control source, The sensing element employs a receive transducer, such as a microphone, and a device for processing the acoustic signals which the receive transducer intercepts. The signal processing device can include a wave analyzer for processing the electrical signals which the receive transducer produces, preferably with syncronization by the control signal source. The device for processing the received signal typically includes an oscilloscope or like display terminal for displaying and/or recording the received signal set.

Practice of the invention enables a microphone to be detected and located rapidly and with an unusually high degree of validity. That is, microphone detection in accordance with the invention has a relatively low error level, in that it produces results which are relatively free of bogus or other false indications of the presence of a microphone. The invention can be practiced with a relatively small and simple compliment of conventional, readily available electronic components. Further it is relatively easy to perform with a relatively low level of operator skill, operates rapidly, and can be used in a number of environments including the detection of microphones on a person or in a room even when recessed in a wall or other structure. In addition, the detection and location of a microphone according to the invention is not effected by whether the microphone is in use or not; the invention detects and locates a microphone simply by virtue of its physical presence.

Moreover, practice of the invention underwater can detect and locate hydrophones and crafts fitted with such transducing devices, with like advantages.

The invention accordingly comprises the several steps and the relation of one or more of such steps with respect to each of the others, and the apparatus embodying features of construction, combinations of elements and arrangements of parts adapted to effect such steps, all as exemplified in the following detailed disclosure, and the scope of the invention is indicated in the claims.

For a full understanding of the nature and objects of the invention, reference may be made to the following detailed description and accompanying drawings in which.

DESCRIPTION OF ILLUSTRATED EMBODIMENTS

Figure 1:
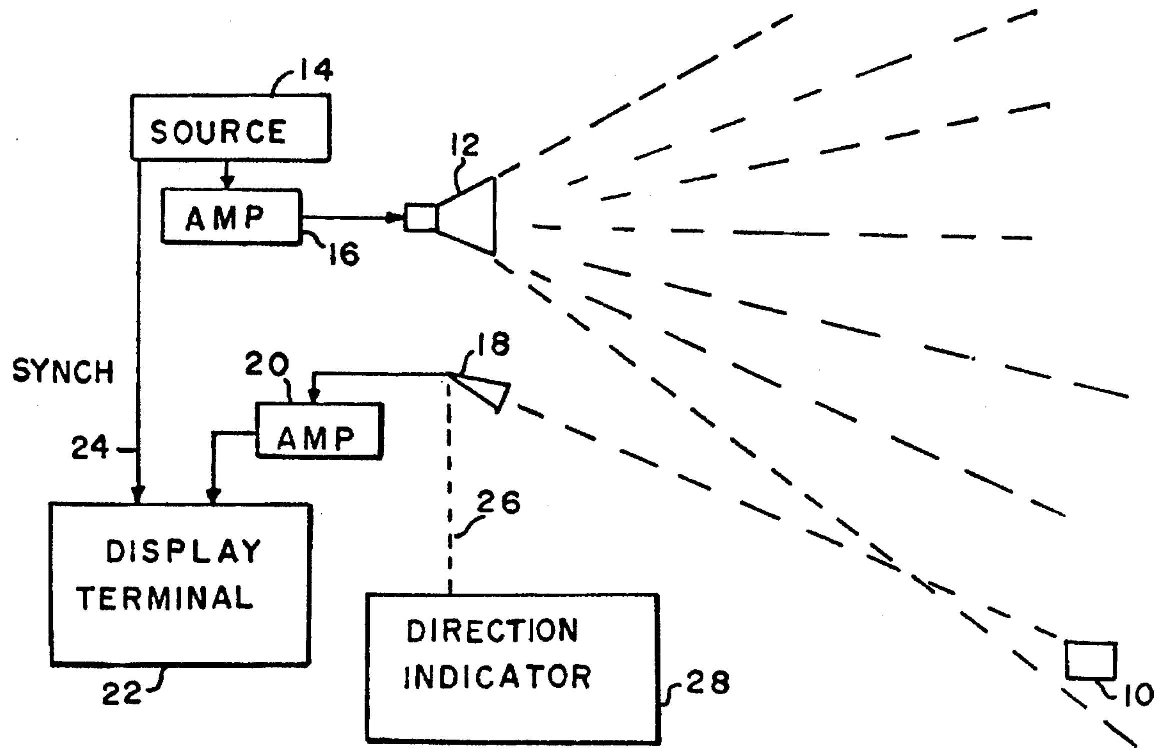
FIG. 1 is a block schematic representation of microphone detection and location apparatus according to the invention.

The practice of the invention illustrated in FIG. 1 locates a target object 10 with an electro acoustic transducer 12 which a source 14 drives, illustratively through an amplifier 16, to broadcast a selected acoustic signal. A further electro acoustic transducer 18 receives acoustic signals and applies a corresponding electrical signal, typically through an amplifier 20, to an output device illustrated as a CRT display terminal 22. The illustrated display terminal also receives a synchronize signal from the source 14, by way of a conductor 24, to synchronize a display of the received acoustic signal with the broadcast signal.

The illustrated receive transducer 18 is coupled by a linkage 26, shown with a dashed line, to a direction indicator 28. The indicator 28, when used, can identify the location of a target object 10 by identifying the relative direction in which the receive transducer is aimed to attain the maximum, i.e. strongest, acoustic signal indicative of the presence of a target object.

The illustrated detect and locate equipment of FIG. 1 employs a loudspeaker as the broadcast acoustic transducer 12, and employs a microphone or like acoustic detector as the receive transducer 18. In one preferred embodiment, the broadcast transducer emits acoustic energy over a broad or wide spatial field, and the receive transducer has a narrow spatial field and is scanned over the broad broadcast field. One alternative is that both transducers have narrow fields, and are both swept across the site being examined. The display terminal 22 preferably includes a CRT oscilloscope, and may include a spectrum analyzer, or other signal analyzer as will be apparent to those skilled in the art.

The acoustic signal which the broadcast transducer 12 transmits, and which the source 14 drives the transducer 12 to produce, has a component that includes a mechanical resonant frequency of the target object 10 being investigated, and has a component that includes a different, second frequency. One preferred practice is that the first signal component be a sinusoid at the resonant frequency of interest, and that the second component modulate or gate the first component at the desired second frequency. The second frequency is, in an illustrative preferred practice, approximately one order of magnitude less than the first frequency, The illustrated second signal component, moreover, is produced at a selected repetition rate, to produce bursts of the first component of selected duration and spaced by a selected interval.

A specific instance of this preferred practice of the invention as illustrated in FIG. 1 employs a source 14 that drives the broadcast transducer 12 with a 21.5 kilohertz sinusoidal signal amplitude modulated, e.g. gated, by a two kilohertz signal at an interval of twelve milliseconds. The resultant broadcast signal in this illustrative instance hence consists of bursts, each of four or five cycles, of the 21.5 KHZ sinusoid occurring approximately every twelve milliseconds.

This broadcast signal is selected in view of the finding that it excites certain target objects 10 to emit an acoustic signal that is a unique function of the incident acoustic signal. One feature of the selected incident acoustic signal is that it includes a frequency component at a mechanical resonant frequency of the target object. A further feature of the incident acoustic signal is that it includes a second frequency component that is different from and less than the frequency of the first component. A further selection factor for the second component is that it combine with the first component to produce arithmetic sum and difference frequencies which can readily be detected acoustically, and processed, for example with the receive transducer 18, amplifier 20 and display terminal 22 or other wave analyzer.

More particularly, in response to excitation by such a broadcast acoustic signal at a first resonant frequency and modulated at a lesser second frequency, the target object of interest rebroadcasts an acoustic signal with one component at a frequency equal to the sum of the two incident component frequencies and with a further component at a frequency equal to the difference between the incident frequencies. Thus, in the illustrated embodiment, the target object 10 with a resonant frequency at 21.5 kilohertz rebroadcasts an acoustic signal having a difference frequency component at 19.5 kilohertz and having a sum frequency component at 23.5 kilohertz.

The rebroadcast signals of interest from the target object 10 are understood to be modulation products of the two frequencies of the incident, broadcast signal.

A display or other indication by the display terminal 12 of at least one of these rebroadcast signals, i.e. side band signal frequencies, indicates the presence of a target object 10 in the broadcast field and having an acoustic, i.e. mechanical, resonance at the first frequency. The direction indicator displays or otherwise identifies the angular bearing of the detected object, relative to the receive transducer 18, when the receive transducer is oriented, i.e. aimed, to maximize the target—responsive rebroadcast signal. The arrow 29 indicates the movable mounting of the receive transducer 18 for aiming it at a detected target.

Figure 2:
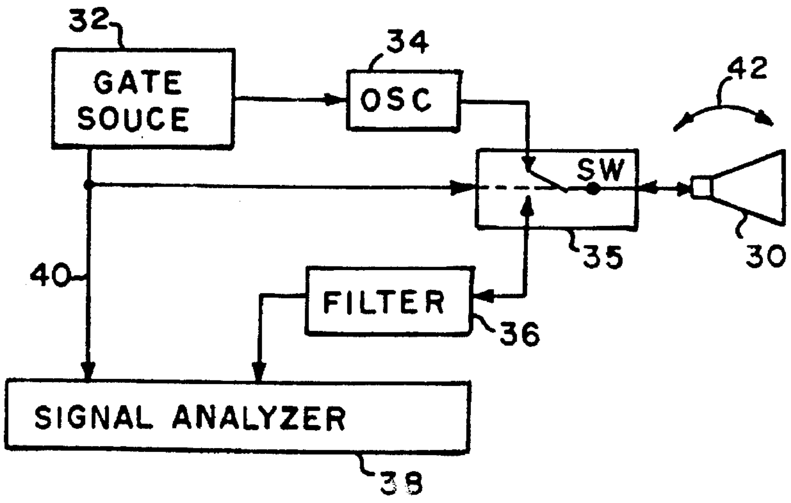
FIG. 2 is another block schematic representation of apparatus according to the invention.
Figure 3:
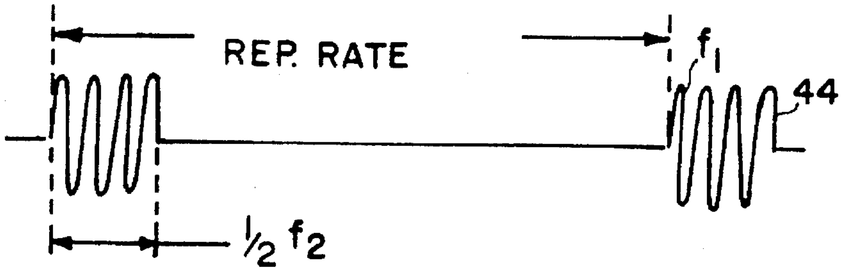
FIG. 3 illustrates a broadcast signal with which the apparatus of FIGS. 1 and 2 operate.

FIG. 2 shows another representation of apparatus for practicing the invention and having a single electro acoustic transducer 30 that provides both acoustic broadcast and acoustic detection. A gate source 32 and an oscillator 34, which together correspond to the source 14 of the FIG. 1 embodiment, energize the tranducer 30, through a steering switch 35, to provide the desired broadcast signal. More particularly, the illustrated gate source 32 produces a gating signal, of selected duration and selected repetition rate, that drives the oscillator 34 to produce a sinusoidal output at the selected intervals only during each half cycle of the gating signal frequency. FIG. 3 shows a gated sinusoid waveform 44 that illustrates the resultant output signal waveform from the oscillator 34 and the corresponding acoustic waveform which the transducer 30 broadcasts in response.

The embodiment of FIG. 2 further employs a filter 36 connected, by way of the switch 35, between the leads of the transducer 30 and a signal analyzer 38. The filter applies to the analyzer received signals at the selected sum and difference frequencies of the broadcast signal, and substantially excludes or blocks other frequencies, including the first and second broadcast signal frequencies. The analyzer 38 typically receives a synchronize signal from the gate source 32, by way of a synch lead 40. The synchronize signal is also applied to the steering switch 35 to actuate the switch to apply the gated sinusoid bursts to the transducer 30 for broadcast. During the quiescent intervals of the oscillator 34, when there is no active output signal, the switch 35 is conditioned by the synchronize signal to apply to the signal analyzer the signals which the transducer produces in response to the acoustic rebroadcasts of interest. FIG. 2 further indicates with the arrow 42 that the transducer 30 can be scanned or aimed in different directions, for broadcasting in different directions and correspondily for receiving from different directions. A direction indicator and scan control element (not shown) can be provided with skills known in the art.

Figure 4:
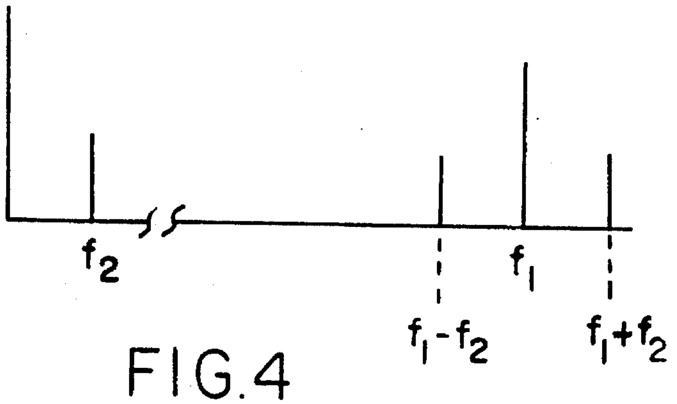
FIG. 4 shows a signal spectrum diagram that further illustrates operation according to the invention.

The spectrum diagram of FIG. 4 shows the illustrated broadcast frequency components of 21.5 KHZ and two kilohertz as lines 46 and 48, respectively. The frequency sum and difference modulation products which the target device of interest rebroadcasts appear as lines 50 and 52, respectively, much like upper and lower sidebands.

Object detection systems according to the invention and as illustrated in FIGS. 1 and 2 can broadcast an acoustic signal that sweeps in frequency, to detect and locate a target object 10 for which the resonant frequency is not known. More particularly, with reference for example to FIG. 1, where the resonant frequency of a target object 10 being investigated is not known or is not known precisely, the source 14 can produce an electrical signal in which the first component sweeps in frequency across a band of interest, for broadcasting coresponding acoustic signal. The frequency of the second broadcast component can, for this alternate practice of the invention, be maintained uniform over the sweep frequency or be changed, at the choice of the practitioner. A constant second component frequency is considered preferable for ease in implementation and operation.

Thus, with reference to FIG. 2, the invention can be practiced with a gate source 32 of fixed frequency, i.e. a gating pulse of fixed duration as well as of fixed repitition rate, and with an oscillator 34 having a frequency that sweeps across a selected range of frequencies. Conversely, both the frequency of the oscillator 34 and the pulse duration and/or repition rate of the gate source 32 can sweep, although this latter practice is deemed less preferable.

It is understood that the frequency of the first component of the broadcast signal is, as stated, selected to excite an acoustic resonance of the target device. The frequency of the second broadcast signal component is understood to be selected to provide a gating signal duration that delivers sufficient cycles of the first component to energize the resonant structure of the target object to rebroadcast a signal with sufficient strength for reliable detection. Further, the repitition rate of the second component is understood to be selected to provide an interval, between successive gated bursts of the first component, for signal propagation both to the target object being investigated and back to the receive transducer. This interval accordingly reflects the spatial distance being examined and the speed of signal propagation in the medium, e.g. air or ocean water, where the investigation is being conducted.

Although the practice of the invention as described above typically occurs in air, the invention is deemed applicable in any medium in which acoustic energy propagates. One use in a medium other than air is underwater, in particular to detect hydrophones and craft, e.g. submarine, that typically are fitted with transducers on the hull or other outer housing.

Figure 5:
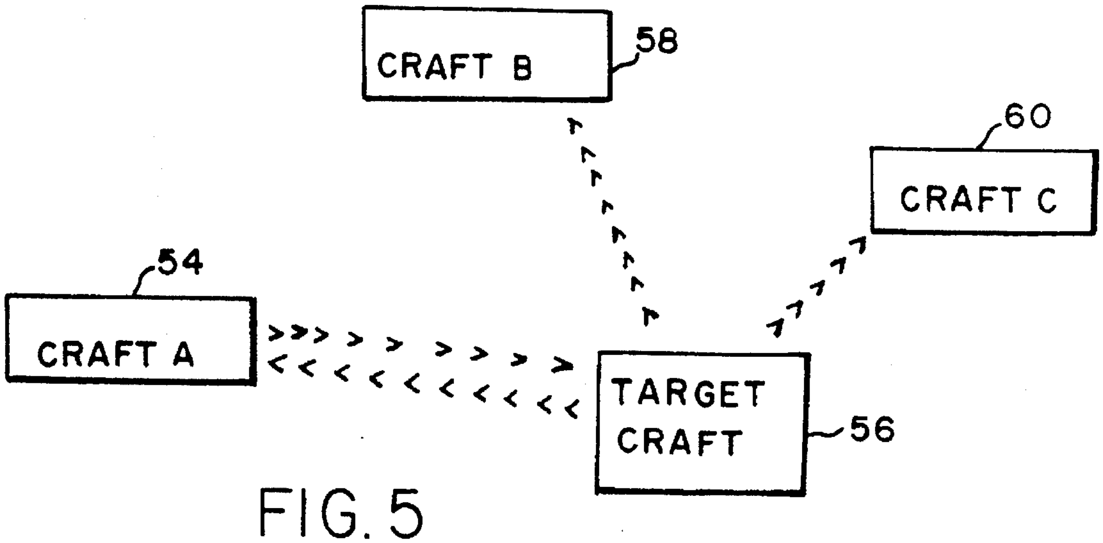
FIG. 5 shows a further practice of the invention in an underwater medium.

In one preferred underwater practice of the invention, as FIG. 5 shows, a search craft 54 employs equipment according to FIGS. 1 or 2 to broadcast a composite acoustic signal. When a target craft 56 fitted with one or more hydrophones is present, any rebroadcast by it of resonant response signals is detected at search craft in the manner described with reference to FIGS. 1–4. Detection of the rebroadcast signals enable the equipment on the search craft to determine the presence of the target craft, and its relative location.

FIG. 5 further illustrates one optional variation with which the invention can be practiced in any medium, e.g. in air or underwater. This variation employs one or more detection sites, e.g. at a first further craft 58 and at a second further craft 60, each at a known location different from the broadcast site of the search craft 59. That is, the invention can be practiced with a single detection site different from the broadcast site, as well as with multiple detection sites, typically including one at the broadcast site.

The method of the invention and the apparatus for practicing it as described above have been found to be surprisingly successful in detecting target objects 10, in particularly microphones, that are hidden from view, whether carried on a person or located in interior furnishings or interior structures or elsewhere, Further, the relative location of a detected microphone can be ascertained with relatively high precision, by practice of the invention with a transducer for signal reception which has relatively high acoustic directionality.

In addition to the foregoing practice of the invention in air, at normally encountered atmospheric conditions, the invention can be used in other acoustic media. One noteworthy practice in a different media is underwater, for the detection of submerged microphones and like transducing devices, and in particular of a hydrophone. Apparatus as shown in FIGS. 1 and 2 can, accordingly, be used to broadcast a composite acoustic signal underwater as FIG. 5 illustrates, and to detect either or both resonant response sidebands as described. The frequency of the first component of the incident signal is again at the hydrophone acoustic resonance being investigated. The second component of the incident signal is likewise selected to attain sum and/or difference components that can be instrumented. It is understood in fact that incident frequency components similar to those described above can be used for underwater hydrophone detection.

This method and apparatus for the detection and location of hydrophone devices further enables an underwater craft which is fitted with one or more such devices to be detected and located. This practice of the invention accordingly leads to ready detection and location of such craft as a submarine and a hydrophone equipped torpedo.

It will thus be seen that the method and apparatus described herein efficiently attain the objects set forth above, among those made apparent from the preceeding description. Since certain changes may be made in carrying out the above process, and in the construction set forth, without departing from the scope of the invention, it is intended that all matter contained in the above description or shown in the accompanying drawings be interpreted as illustrative and not in a limiting sense.

It is also to be understood that the following claims are intended to cover all generic and specific features of the invention herein described, and all statements of the scope of the invention which, as a matter of language, might be said to fall therebetween.

Having described the invention, what is claimed as new and secured by Letters Patent is:

1. A method for detecting the presence, at a selected site, of an electro acoustic transducing device having a mechanical resonance at an acoustic frequency, said method comprising the steps of A. broadcasting at the site an acoustic signal having at least first and second components, where said first component includes a first frequency that is a unity or other multiple of an acoustic resonant frequency of the device, and said second component includes a second frequency less than said first frequency, and wherein arithmetic combinations of said first and second frequencies yield sum and difference frequencies suitable for acoustic propogation and for electro acoustic transduction, and B. sensing an acoustic resonant response signal which includes a component with a frequency equal to at least one of the sum and the difference of said first and second frequencies.

2. A method according to claim 1 further characterized in that said sensing step includes sensing a response signal that includes a component with a third frequency equal to the arithmetic sum of said first and second frequencies, and that further includes a component with a fourth frequency equal to the arithmetic difference between between said first and second frequencies.

3. A method according to claim 1 further characterized in that said broadcasting step includes selecting said second component to include a second frequency with a value substantially one order of magnitude less than said first frequency.

4. A method according to claim 1 further characterized in that said broadcasting step includes selecting said second component to gate said first component for a selected duty cycle determined by said second frequency and with a selected gating repetition rate.

5. Apparatus for detecting an electro acoustic transducing device having a mechanical resonance at an acoustic frequency, said apparatus comprising A. acoustic broadcasting means for broadcasting acoustic signal having at least first and second components, where said first component includes a first frequency that is a unity or other multiple of an acoustic resonant frequency of the device, and said second component includes a second frequency that is less than said first frequency, and wherein arithmetic combinations of said first and second frequencies yield sum and difference frequencies suitable for acoustic propogation and for electro acoustic transduction, and B. means for sensing an acoustic resonant response signal which includes a component with a frequency equal to at least one of the sum and the difference of said first and second frequencies.

6. Apparatus according to claim 5 further characterized in that said sensing means includes means for sensing a response signal set that includes a component at a third frequency equal to the arithmetic sum of said first and second frequencies, and a component at a fourth frequency equal to the arithmetic difference between said first and second frequencies.

7. Apparatus according to claim 5 further characterized in that said broadcasting means includes means for broadcasting said second component with a second frequency at a value substantially one order of magnitude less than said first frequency.

8. Apparatus according to claim 5 further characterized in that said broadcasting means includes means for selecting said second component to gate said first component for a selected duty cycle determined by said second frequency and with a selected gating repition rate.

9. A method for broadcasting the presence, at a selected site, of an electro acoustic transducing device having a mechanical nonlinearity at an acoustic frequency, said method comprising the steps of A. broadcasting at the site an acoustic signal having at least first and second components, where said first component includes a first frequency that is a unity or other multiple of an acoustic nonlinearity frequency of the device, and second frequency less than said frequency, and wherein arithmetic combinations of said first and second frequencies yield sum and difference frequencies suitable for acoustic propogation and for electro acoustic transduction, and B. sensing an acoustic nonlinearity response signal which includes a component with a frequency equal to at least one of the sum and the difference of said first and second frequencies.

10. Apparatus for detecting an electro acoustic transducing device having a mechanical nonlinearity at an acoustic frequency, said apparatus comprising A. acoustic broadcasting means for broadcasting acoustic signal having at least first and second components, where said first component includes a first frequency that is a unity or other multiple of an acoustic nonlinearity frequency of the device, and said second component includes a second frequency that is less than said first frequency, and wherein arithmetic combinations of said first and second frequencies yield sum and difference frequencies suitable for acoustic propogation and for electro acoustic transduction, and B. means for sensing an acoustic nonlinearity response signal which includes a component with a frequency equal to at least one of the sum and the difference of said first and second frequencies.

11. Apparatus according to claim 10 further characterized in that said sensing means includes a component at a third frequency equal to the arithmetic sum of said first and second frequencies, and a component at a fourth frequency equal to the arithmetic difference between said first and second frequencies.

12. A method for the detection of a microphone device, said method comprising the successive stems of A. broadcasting within a broadcast field an acoustic signal having first and second frequency components having respective frequencies for producing a re-broadcast, by microphone device within a broadcast field, of a selected resonant reponse signal, and B. sensing the re-broadcast of such a response signal that includes acoustic signals that are the sum and the difference side bands of said first and second frequency components, and wherein said sensing step includes sensing at least one of said sum and difference side band signals.

13. A method for the detection of a microphone device, said method comprising the successive steps of A. broadcasting within a broadcast field an acoustic signal for producing a re-broadcast, by a microphone device within the broadcast field, of a selected resonant reponse signal, said acoustic signal having a first frequency component at 21.5 kilohertz and gated at a second frequency component of two kilohertz, and B. sensing the re-broadcast of such a response signal, said sensing step including sensing acoustic signals that are the sum and the difference side bands of said first and second frequency components.

14. A method for the detection of a microphone device comprising the successive steps of A. broadcasting within a broadcast field an acoustic signal having first and second frequency components having frequencies for producing a re-broadcast, by a microphone device within the broadcast field, of a selected nonlinear response signal, and B. sensing the re-broadcast of a response signal that includes acoustic signals that are the sum and the difference side bands of said first and second frequency components, said sensing step including sensing at leats one of said sum and difference side band signals.

15. A method for the detection of a microphone device comprising the successive steps of A. broadcasting within a broadcast field an acoustic signal having first and second frequency components having frequencies for producing a re-broadcast, by a microphone device within the broadcast field, of a selected nonlinear response signal, said broadcasting step including selecting said first frequency component to be at a non-linear response frequency of a microphone device being detected and selecting said second frequency component to be at a lower frequency, and B. sensing the re-broadcast of a response signal, including sensing at least one acoustic signal that is any one of the sum and the difference of said first and second frequency components, C. said broadcasting step and said sensing step being performed with acoustic signals propagating in air.

16. A method for the detection of a microphone device comprising the successive steps of A. broadcasting within a broadcast field an acoustic signal having first and second frequency components having frequencies for producing a re-broadcast, by a microphone device within the broadcast field, of a selected nonlinear response signal, said broadcasting step including selecting said first frequency component to be at a non-linear response frequency of a microphone device being detected and selecting said second frequency component to be at a lower frequency, and B. sensing the re-broadcast of a response signal, including sensing at least one acoustic signal that is any one of the sum and the difference of said first and second frequency components.

C. said broadcasting step and said sensing step being performed with acoustic signals propagating in water.

* * * * *